United States Patent [19]

Garcia

[11] Patent Number: 4,477,364

[45] Date of Patent: Oct. 16, 1984

[54] ACIDIC GLASS CLEANING COMPOSITION

[75] Inventor: Silverio M. Garcia, Norman, Okla.

[73] Assignee: Capetrol International, Inc., Norman, Okla.

[21] Appl. No.: 549,289

[22] Filed: Nov. 7, 1983

[51] Int. Cl.³ .................................................. C11D 7/08
[52] U.S. Cl. ................................... 252/142; 252/79.3;
252/86; 252/87; 252/136; 252/173; 252/174.19;
252/178; 252/180; 252/181; 252/DIG. 10;
134/3; 134/28
[58] Field of Search .................. 252/79.3, 86, 87, 136,
252/142, 173, 178, 179, 180, 181, DIG. 10,
174.19; 134/3, 28

[56] References Cited

U.S. PATENT DOCUMENTS

| | | | |
|---|---|---|---|
| 3,448,055 | 6/1969 | Mickelson et al. | 134/3 |
| 3,514,407 | 5/1970 | Missel | 252/142 |
| 4,181,622 | 1/1980 | Gavin | 252/142 |
| 4,199,469 | 4/1980 | Walger | 252/181 |
| 4,250,048 | 2/1981 | Leveskis | 252/142 |

FOREIGN PATENT DOCUMENTS 2158664  6/1973  France .
  69383  6/1981  Japan .

Primary Examiner—Paul Lieberman
Assistant Examiner—Hoa Van Le
Attorney, Agent, or Firm—Glen M. Burdick

[57] ABSTRACT

An acidic glass cleaning composition for removal of residue, deposits and impurities from glassware is provided, the improved acidic glass cleaning composition comprising from about 1 to about 15 weight percent hydrofluoric acid and from about 85 to about 99 weight percent of an aqueous acidic composition having a pH value of less than about 1. The aqueous acidic constituent employed in the acidic glass cleaning composition is prepared by the steps of: (a) mixing from about 20 to about 30 weight percent hydrochloric acid with from about 16 to about 26 weight percent phosphoric acid for an effective period of time to produce a substantially homogeneous acidic mixture; (b) admixing the substantially homogeneous mixture into an effective amount of water to provide an aqueous acidic mixture containing from about 36 to about 62 weight percent water; (c) admixing from about 5 to about 11 weight percent of a hydroxy carboxylic acid into the aqueous acidic mixture to produce a hydroxy carboxylic acid containing aqueous acidic mixture; and (d) admixing from about 3 to about 7 weight percent of a dicarboxylic acid into the hydroxy carboxylic acid containing aqueous acidic mixture.

5 Claims, No Drawings

ACIDIC GLASS CLEANING COMPOSITION

BACKGROUND OF THE INVENTION

1. Field of the Invention

The present invention relates to acidic compositions, and more particularly but not by way of limitation, to an acidic glass cleaning composition having a pH value of less than about 1.

2. Brief Discussion of the Prior Art

Large quantities of glassware are often used in laboratories in the carrying out of experiments, and for storage of chemical compounds and the like. Such glassware must be cleaned prior to use to insure that the glassware is substantially free of impurities such as residue, deposits and the like which may be present as a result of a prior use of the glassware.

Numerous compositions have heretofore been employed to clean laboratory glassware, such as aqueous detergent solutions, caustic solutions, acidic solutions and organic solvents. However, the use of such glass cleaning compositions often creates serious disposal problems; and certain of the compositions are extremely corrosive or flamable. Further, the use of the prior art glass cleaning compositions are generally very time consuming in that they require handscrubbing and numerous rinsing of the glassware to insure removal of any residue from the glassware, including any residues formed on the glassware by the cleaning compositions.

Numerous advances have been made in recent years in the area of detergents for cleaning glassware. However, even the improved detergents appear to be limited as to the types of residue, deposits and the like which can be effectively removed from laboratory glassware. Further, the use of such new and improved detergent compositions often requires one to subject the glassware to scrubbing in the presence of the detergent composition, either by hand or with an automatic dishwashing machine, and numerous rinses of the clean glassware to insure removal of deposits therefrom. Because of the necessity of using substantially clean glassware in the conducting of experiments in the laboratory, and in the storage of chemical compositions, new and improved glass cleaning compositions are highly desirable, especially glass cleaning compositions which are safe to use, non-flamable, and which can be safely disposed of without damage to the sewer system.

SUMMARY OF THE INVENTION

According to the present invention an improved acidic glass cleaning composition is provided which effectively cleans residue and deposits from glassware. The acidic glass cleaning compositions of the present invention, which have pH values of less than about 1, comprise from about 1 to about 15 weight percent hydrofluoric acid and from about 85 to about 99 weight percent of an aqueous acidic constituent containing from about 30 to about 50 weight percent water. The aqueous acidic constituent employed in the formulation of the acidic glass cleaning composition of the present invention is prepared by a process involving the following series of steps:

(1) mixing from about 20 to about 30 weight percent hydrochloric acid with from about 16 to about 26 weight percent phosphoric acid for an effective period of time to produce a substantially homogeneous acidic mixture;

(2) admixing the substantially homogeneous acidic mixture into an effective amount of water to provide an aqueous acidic mixture containing from about 36 to about 62 weight percent water;

(3) admixing from about 5 to about 11 weight percent of a hydroxy carboxylic acid into the aqueous acidic mixture to produce a hydroxy carboxylic acid containing aqueous acidic mixture; and (4) admixing from about 3 to about 7 weight percent of a dicarboxylic acid into the hydroxy carboxylic acid containing aqueous acidic mixture.

An object of the present invention is to provide an improved glass cleaning composition which effectively and effeciently removes deposits, residue and impurities from glassware.

Another object of the present invention, while achieving the above stated object, is to provide an improved composition for use in the cleaning of glassware which is substantially nontoxic and inert to human skin and clothing.

Another object of the present invention, while achieving the above stated objects, is to provide an improved composition which does not deposit a residue on the glassware after cleaning of the glassware with the composition.

Other objects, advantages, and features of the present invention will become apparent from the following detailed description when read in conjunction with the appended claims.

DESCRIPTION OF THE PREFERRED EMBODIMENTS

The present invention provides an improved acidic composition for use in the cleaning of glassware, such as laboratory glassware used for conducting experiments and in the storage of chemical compositions and the like. The acidic glass cleaning compositions of the present invention have pH values of less than about 1 and yet are substantially inert to human skin and clothing. Broadly, the acidic glass cleaning compositions of the present invention comprise from about 1 to about 15 weight percent hydrofluoric acid and from about 85 to about 99 weight percent of an aqueous acidic constituent. The aqueous acidic constituent, which also has a pH value of less than about 1, is prepared by a series of steps using selected inorganic and organic acids.

The exact chemical structure of the acidic glass cleaning composition of the present invention, or the aqueous acidic constituent of the glass cleaning compositions are not known. However, one theory is that during the mixing of the acid components employed in the formation of the aqueous acidic constituent of the acidic glass cleaning compositions, a high concentration of hydrogen ions (H+) are released into and remain present in the aqueous acidic constituent. Thus, when hydrofluoric acid is admixed with the aqueous acidic constituent in specified amounts, the high concentration of hydrogen ions present in the aqueous acidic constituent prohibits the release of hydrogen ions from the hydrofluoric acid molecule so that the resulting acidic glass cleaning composition is substantially inert, both to human skin and clothing, and does not become active until the acid molecules of the glass cleaning composition can release their hydrogen atoms by contact with deposits, residues and impurities on the surface of the glassware to be cleaned.

As previously stated, the acidic glass cleaning compositions of the present invention, and the aqueous acidic constituent of such glass cleaning compositions, have pH values of less than about 1. The term "pH value" is generally employed as the means for expressing the degree of acidity or basicity of a solution. For example, at normal temperature a neutral solution (such as pure distilled water) has a pH of about 7; whereas a one-tenth normal solution of hydrochloric acid (approximately 3.65 grams hydrochloric acid per liter of water) has a pH near 1 and is considered strongly acidic. Thus, the acidic glass cleaning compositions of the present invention, as well as the aqueous acidic constituent employed in the preparation of the acidic glass cleaning compositions, are considered strongly acidic in that each has a pH value of less than about 1.

The aqueous acidic constituent employed in the formulation of the acidic glass cleaning compositions of the present invention is prepared by a process where the ingredients are believed critical. All mixing and storage containers employed in the production of the aqueous acidic constituent are desirably fabricated of a substance that is acid resistant, such as stainless steel, plastic, fiberglass, glass and the like. It is also desirable that all containers used in the preparation of the aqueous acidic constituent be provided with covers for safety reasons and to keep foreign materials out of the product, especially the container in which the hydrochloric acid and phosphoric acid are admixed.

The initial step in the preparation of the aqueous acidic constituent comprises admixing from about 20 to about 30 weight percent hydrochloric acid with from about 16 to about 26 weight percent phosphoric acid for an effective period of time to produce a substantially homogeneous acidic mixture. Because strong fumes are emitted upon mixing the hydrochloric aciCd and the phosphoric acid, care should be exercised in the mixing of the two acidic components to insure that the mixing step is carried out in a well ventilated area or hood. The time required to mix the hydrochloric acid and the phosphoric acid so as to provide a substantially homogeneous mixture can vary widely; and the mixing time or period will generally depend upon the rate of addition of the two acidic components, the amounts of the two acidic components employed, and the rate or speed of agitation and the like.

The homogeneous acidic mixture formed from the hydrochloric acid and the phosphoric acid is then admixed with an effective amount of water to produce an aqueous acidic mixture. The amount of water employed in the formulation of the aqueous acidic mixture can vary widely, but will generally be an amount sufficient to provide from about 36 to about 62 weight percent water in the aqueous acidic mixture.

The aqueous acidic mixture is thoroughly stirred to insure substantially complete dispersion of the homogeneous acidic mixture of the hydrochloric acid and the phosphoric acid in the water and to provide a substantially uniform aqueous acidic mixture. While maintaining agitation on the aqueous acidic mixture, from about 5 to about 11 weight percent of a hydroxy carboxylic acid and from about 3 to about 7 weight percent of a dicarboxylic acid are admixed with the aqueous acidic mixture to produce the aqueous acidic constituent having a pH value of less than about 1.

The amount of each of the constituents employed in the production of the aqueous acidic constituent can vary within the ranges set forth above. However, it is desirable that the water, hydroxy carboxylic acid and dicarboxylic acid be incorporated into the acidic mixture of the hydrochloric acid and the phosphoric acid to provide the aqueous acidic constituent with from about 30 to about 50 weight percent water.

Any suitable hydroxy carboxylic acid can be employed in the preparation of the aqueous acidic constituent of the acidic glass cleaning composition. Typical of such hydroxy carboxylic acids are citric acid, tartaric acid, malic acid, and the like. However, the most desirable hydroxy carboxylic acid employed in the formulation of the aqueous acidic constituent of the glass cleaning composition is citric acid.

Similarly, any suitable dicarboxylic acid can be employed in the preparation of the aqueous acidic constituent of the acidic glass cleaning composition. Typical of such dicarboxylic acids are oxalic acid, malonic acid, succinic acid, glutaric acid, adipic acid and the like. However, the most desirable dicarboxylic acid employed in the formulation of the aqueous acidic constituent is oxalic acid.

The aqueous acidic constituent prepared above is a substantially colorless liquid having an appearance and density substantially similar to that of water. Further, the aqueous acidic constituent, even though having a pH value of less than about 1, is substantially inert to human skin, clothing and the like and thus easily handled. Further, the substantially inert properties of the aqueous acidic constituent are imparted to the acidic glass cleaning composition of the present invention (even though such composition contains from about 1 to about 15 weight percent hydrofluoric acid) until such time as the acidic glass cleaning composition is rendered active by contact with residue, deposits, and impurities on the surface of the glassware being cleaned. When the acidic glass cleaning composition is contacted with residue, deposits, and impurities on the surface of the glassware, the acidic glass cleaning composition becomes active and dissolves the residue, deposits, and impurities on the surface of the glassware. Once the residue, deposits and impurities present on the surface of the glassware have been dissolved by the acidic glass cleaning composition, the composition appears to revert to its inactive state and does not appear to attack the glass surface (even though hydrofluoric acid is present in the acidic glass cleaning composition).

The aqueous acidic constituent produced as set forth above is an essential ingredient in the formulation of the acidic glass cleaning compositions of the present invention. In the preparation of the acidic glass cleaning compositions from about 1 to about 15 weight percent hydrofluoric acid is admixed with the aqueous acidic constituent until a substantially uniform mixture is obtained. It should be noted that the aqueous acidic constituent is preferably maintained under agitation during the mixing of the hydrofluoric acid so that the resulting acidic glass cleaning composition is a substantially homogeneous solution.

The time required to thoroughly mix the hydrofluoric acid with the aqueous acidic constituent to form the acidic glass cleaning composition can vary widely; and the mixing time and period will generally depend on the rate of addition of the hydrofluoric acid to the aqueous acidic constituent, the amount of hydrofluoric acid employed in the formulation of the acidic glass cleaning composition, and the rate of speed of agitation of the aqueous acidic constituent during the addition of the hydrofluoric acid.

The mixing and storage containers employed in the production of the acidic glass cleaning composition are desirably fabricated of a substance that is acid resistant, such as stainless steel, plastic, fiberglass, glass and the like. It is also desirable that all containers used in the preparation of the acidic glass cleaning composition be provided with covers for safety reasons and to keep foreign materials out of the acidic glass cleaning composition.

In order to more fully describe the present invention, the following examples are set forth. However, it is to be understood that the examples are for illustrative purposes and are not to be construed as limiting the scope of the present invention as defined in the appended claims.

EXAMPLE I

Preparation of Aqueous Acidic Constituent Having a pH of Less Then About 1

25 pounds of hydrochloric acid and 21 pounds of phosphoric acid were added to an acid resistant container and the acids were stirred to produce a substantially homogeneous acidic mixture. 40 pounds of water was added to a second container. While maintaining constant stirring of the water, the homogeneous acidic mixture of hydrochloric acid and phosphoric acid was slowly added to the water to produce a resulting aqueous acidic mixture. Thereafter, 8 pounds of citric acid and 5 pounds of oxalic acid were admixed into the resulting aqueous acidic mixture to produce an aqueous acidic composition having a pH of less than about 1 and containing about 40 weight percent water. The aqueous acidic composition, although being strongly acidic in nature, did not appear to irritate or attack human skin or clothing.

EXAMPLE II

Preparation of Acidic Glass Cleaning Composition

A portion of the aqueous acidic composition (approximately) prepared in Example I is introduced into a second container. While maintaining constant stirring on the aqueous acidic composition, an effective amount of hydrofluoric acid (approximately 9 pounds) is added to the aqueous acidic composition. The acidic glass cleaning composition is a substantially colorless liquid having a pH value of less than about 1 and containing about 37 weight percent water. The acidic glass cleaning composition possesses the unique properties of the aqueous acidic constituent in that the glass cleaning composition does not appear to attack human skin or clothing.

EXAMPLE III

The glass cleaning composition as prepared in accordance with Example II is used to clean laboratory glassware. Two 600 ml. beakers, two 1000 ml. flasks and two 100 ml. volumetric flasks are used in this Example. Each piece of glassware is washed by hand in the usual washing manner using Palmolive dish soap. After washing thoroughly each piece of laboratory glassware is rinsed in cool tap water. One group of glassware consisting of one beaker, one flask and one volumetric flask is rinsed ten times in distilled water and inverted on a shelf to air dry. A second group of glassware consisting of one beaker, one flask and one volumetric flask is rinsed for two minutes in two gallons of the acidic glass cleaning solution, rinsed ten times in distilled water and inverted on a shelf and left to air dry. After air drying the glassware cleaned in the acid composition appears cleaner without any residues detectable on the glass surfaces, even on the side walls and bottom wall of the volumetric flask.

The above examples clearly illustrate the improved acidic glass cleaning composition of the present invention. Further, it is clear that the present invention is well adapted to carry out the objects and attain the ends and advantages mentioned herein as well as those inherent in the invention. While presently preferred embodiments of the inven-tion have been described for purposes of this disclosure, numerous changes may be made which will readily suggest themselves to those skilled in the art and which are accomplished within the spirit of the invention disclosed and as defined in the appended claims.

What is claimed is:

1. An acidic glass cleaning composition comprising from about 1 to about 15 weight percent hydrofluoric acid and from about 85 to about 99 weight percent of an aqueous acidic composition having a pH value of less than about 1, the aqueous acidic composition prepared by the steps of:
 (a) mixing from about 20 to about 30 weight percent hydrochloric acid with from about 16 to about 26 weight percent phosphoric acid for an effective period of time to produce a substantially homogeneous acidic mixture;
 (b) admixing the substantially homogeneous acidic mixture into an effective amount of water to provide an aqueous acidic mixture containing from about 30 to about 50 weight percent water;
 (c) admixing from about 5 to about 11 weight percent of a hydroxy carboxylic acid into the aqueous acidic mixture to produce a hydroxy carboxylic acid containing aqueous acidic mixture; and
 (d) admixing from about 3 to about 7 weight percent of a dicarboxylic acid into the hydroxy carboxylic acid containing aqueous acidic mixture.

2. The improved glass cleaning composition of claim 1 wherein the hydrofluoric acid is present in the glass cleaning composition in an amount of about 10 weight percent and the aqueous acidic composition is present in the glass cleaning composition in an amount of about 90 weight percent.

3. The improved glass cleaning composition of claim 1 wherein the hydroxy carboxylic acid is citric acid.

4. The improved glass cleaning composition of claim 1 wherein the dicarboxylic acid is oxalic acid.

5. The improved glass cleaning composition of claim 1 wherein the aqueous acid composition contains from about 30 to about 50 weight percent water.

* * * * *